US007240006B1

(12) United States Patent
Brocious et al.

(10) Patent No.: US 7,240,006 B1
(45) Date of Patent: Jul. 3, 2007

(54) EXPLICITLY REGISTERING MARKUP BASED ON VERBAL COMMANDS AND EXPLOITING AUDIO CONTEXT

(75) Inventors: Larry A. Brocious, Apalachin, NY (US); Michael J. Howland, Endicott, NY (US); Steven M. Pritke, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1353 days.

(21) Appl. No.: 09/670,646

(22) Filed: Sep. 27, 2000

(51) Int. Cl.
*G10L 15/22* (2006.01)

(52) U.S. Cl. .................... 704/270; 704/270.1; 704/275

(58) Field of Classification Search ................ 704/270, 704/270.1, 275; 379/88.01, 88.04, 88.17
See application file for complete search history.

(56) References Cited

U.S. PATENT DOCUMENTS

| | | | | |
|---|---|---|---|---|
| 5,732,216 | A * | 3/1998 | Logan et al. | 709/203 |
| 5,748,186 | A | 5/1998 | Raman | |
| 5,761,641 | A * | 6/1998 | Rozak et al. | 704/275 |
| 5,983,190 | A * | 11/1999 | Trower et al. | 704/276 |
| 6,018,710 | A * | 1/2000 | Wynblatt et al. | 704/260 |
| 6,038,534 | A * | 3/2000 | Richards | 704/275 |
| 6,101,472 | A * | 8/2000 | Giangarra et al. | 704/275 |
| 6,185,535 | B1 * | 2/2001 | Hedin et al. | 704/270 |
| 6,282,511 | B1 * | 8/2001 | Mayer | 704/270 |
| 6,282,512 | B1 * | 8/2001 | Hemphill | 704/270.1 |
| 6,314,402 | B1 * | 11/2001 | Monaco et al. | 704/275 |
| 6,377,927 | B1 * | 4/2002 | Loghmani et al. | 704/275 |
| 6,385,583 | B1 * | 5/2002 | Ladd et al. | 704/270 |
| 6,400,806 | B1 * | 6/2002 | Uppaluru | 379/88.02 |
| 6,418,199 | B1 * | 7/2002 | Perrone | 379/88.01 |
| 6,434,524 | B1 * | 8/2002 | Weber | 704/257 |
| 6,456,974 | B1 * | 9/2002 | Baker et al. | 704/270.1 |
| 6,470,317 | B1 * | 10/2002 | Ladd et al. | 704/275 |
| 6,493,671 | B1 * | 12/2002 | Ladd et al. | 704/270 |
| 6,493,673 | B1 * | 12/2002 | Ladd et al. | 704/275 |
| 6,539,359 | B1 * | 3/2003 | Ladd et al. | 704/275 |
| 6,587,822 | B2 * | 7/2003 | Brown et al. | 704/275 |
| 6,606,611 | B1 * | 8/2003 | Khan | 706/10 |
| 6,718,015 | B1 * | 4/2004 | Berstis | 379/88.17 |
| 6,745,163 | B1 * | 6/2004 | Brocious et al. | 704/260 |
| 7,010,490 | B2 * | 3/2006 | Brocious et al. | 704/275 |

FOREIGN PATENT DOCUMENTS

| | | | |
|---|---|---|---|
| EP | 0847 179 | A2 * | 6/1998 |
| GB | 2317 070 | A | 3/1998 |

* cited by examiner

*Primary Examiner*—Martin Lerner
(74) *Attorney, Agent, or Firm*—Whitham, Curtis, Christofferson & Cook, PC; Arthur J. Samodovitz

(57) ABSTRACT

A generic way of encoding information needed by an application to register voice commands and enable a speech engine are used to tell a browser what to present to the user and what options are available to the user to interact with an application. This is accomplished by enhancements to a markup language which register and enable voice commands that are needed by an application to the speech engine, and provide an audio context for the page scope command by adding a context option to make the page much more flexible and usable. The action of the application can be altered based on the current audio context by adding a context option. The application remains independent of the browser and separate from interaction with the speech engine. The application can accommodate both verbal and visual interactions by registering the verbal commands and identifying to what those commands will translate.

19 Claims, 2 Drawing Sheets

EXPLICITLY REGISTERING MARKUP BASED ON VERBAL COMMANDS AND EXPLOITING AUDIO CONTEXT

BACKGROUND OF THE INVENTION

1. Field of the Invention

The present invention generally relates to enhancements to the HyperText Markup Language (HTML) to tell a browser what to present to a user and what options are available to the user to interact with an application using specific audio commands. In addition, the invention allows a user to register a context sensitive command by dynamically building a resultant Uniform Resource Locator (URL) when the registered verbal command is recognized.

2. Background Description

European Patent Application EP 0 847 179 A2 to D. Mayer, entitled "System and Method for Voiced Interface With Hyperlinked Information", describes a system that uses tones or other audible indicators to identify hypertext links and uses a sliding vocabulary as a page is being read. This allows a user to speak part or all of the most recently spoken hypertext link in order to follow it.

UK Patent Application GB 2 317 070 A to N. Butler et al., entitled "Voice Processing/Internet System", describes a system where a standard markup is altered to allow the specification of voice commands. It does not, however, discuss the exploitation of audio context or the dynamic creation of Uniform Resource Locators (URL) to be followed based on the audio context.

The problem that exists in the prior art is the ability to interact verbally with an application. Current implementations have devices which will read the words on the page, but require keyboard entry of input or an elaborate method of input where the person must spell out what they want to type using specific code words for each letter of the alphabet, such as "alpha" for "a", and so on. In prior art browsers, the application, browser and speech engine are all tightly linked together so that there is no generic solution or way one application can work with multiple browsers/speech engines.

The only way for an application using a current system to get information in context is to be running the application locally on the device reading the words and monitoring the reading. Typically, the reading software tells the application when it is finished reading each line of the text so that the application knows were the person was when context-sensitive input is presented to it. This is not desirable because of the storage requirements needed to download the application, and the degradation in performance caused by constant monitoring.

For example, consider the following source code where a document page contains a list of desserts of apples, peaches and pumpkin pie. There is also a second page, one for each dessert, detailing the caloric information for the chosen dessert. In a typical document, the author of the document would simply make each phrase in the list of desserts a hyperlink. This would allow a user to select (by, for example, clicking with a mouse, or using another tactile means) which link to follow and thus obtain the appropriate follow-on page.

```
<HTML> (1)
<BODY> (2)
<UL> (3)
<LI> (4)
<A HREF="./calories/apples.ebml">Apples</A> (5)
</LI> (6)
<LI> (7)
<A HREF="./calories/peaches.ebml">Peaches</A> (8)
</LI> (9)
<LI> (10)
<A HREF=".calories/pumpkin-pie.ebml">Pumpkin Pie</
  A> (11)
</LI> (12)
</UL> (13)
</BODY> (14)
</HTML> (15)
```

Initial schemes to enable the page for voice input involved registering a specific command for each link to be followed. In the example specified above, the author would register three commands: "Apples", "Peaches" and "Pumpkin Pie". Each verbal command would then be associated with a specific URL to follow if it were recognized. This method may be acceptable for a small number of choices and in situations where it is not desirable to have a user use a common phrase to select a choice. This source code may appear as follows:

```
<HTML> (1)
<HEAD> (2)
//Registers three commands and the URL to associate with the command (3)
//if it is recognized by the speech engine. (4)
<META_VERBALCMD NAME="Apples" URL="./calories/apples.ebml"/> (5)
<META_VERBALCMD NAME="Peaches" URL="./calories/peaches.embl"/> (6)
<META_VERBALCMD NAME="Pumpkin Pie" URL="./calories/pumpkin-pie.ebml"/> (7)
</HEAD> (8)
<BODY> (9)
<UL> (10)
<LI> (11)
<A HREF="./calories/apples.ebml">Apples</A> (12)
</LI> (13)
<LI> (14)
<A HREF="./calories/peaches.embl">Peaches</A> (15)
</LI> (16)
<LI> (17)
<A HREF="./calories/pumpkin-pie.ebml">Pumpkin
  Pie</A> (18)
</LI> (19)
</UL> (20)
</BODY> (21)
</HTML> (22)
```

SUMMARY OF THE INVENTION

It is a therefore an object of the present invention to allow applications to register specific commands that will cause a browser to take an action based on the current audio context of the browser.

It is a further object of the present invention to have a browser take an action based on current audio context and a word or words currently being spoken by a user.

It is yet another object of the invention to allow one application to work with multiple browsers and speech engines.

The present invention provides enhancements to the HTML language that enable an application to tell a multi-modal browser what to present to the user, and what options are available to the user to interact with the application. A "multi-modal browser", as used herein, is one that renders audio and visual components in a synchronized way to the user of the system. The invention registers and enables voice commands, that are needed by an application, with a speech engine, and provides an audio context for the page-scope commands by adding a context option to make the page much more flexible and usable. The invention thus enables a browser to respond to visual or verbal commands, or a combination thereof, by identifying what action will be taken based on the commands.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The markup language utilized by the present invention is referred to as Embedded Browser Markup Language (EBML), which is an extension to the HyperText Markup Language (HTML) tag set. HTML is a well-known collection of markup tags used by the industry primarily in association with the World Wide Web (WWW) portion of the Internet, or simply "the Web". Several standard browsers (e.g., Netscape and Internet Explorer) process these tags during their operation. The following code segments illustrate the tags/constructs that extend the standard HTML tag set in accordance with the present invention.

Figure 1:
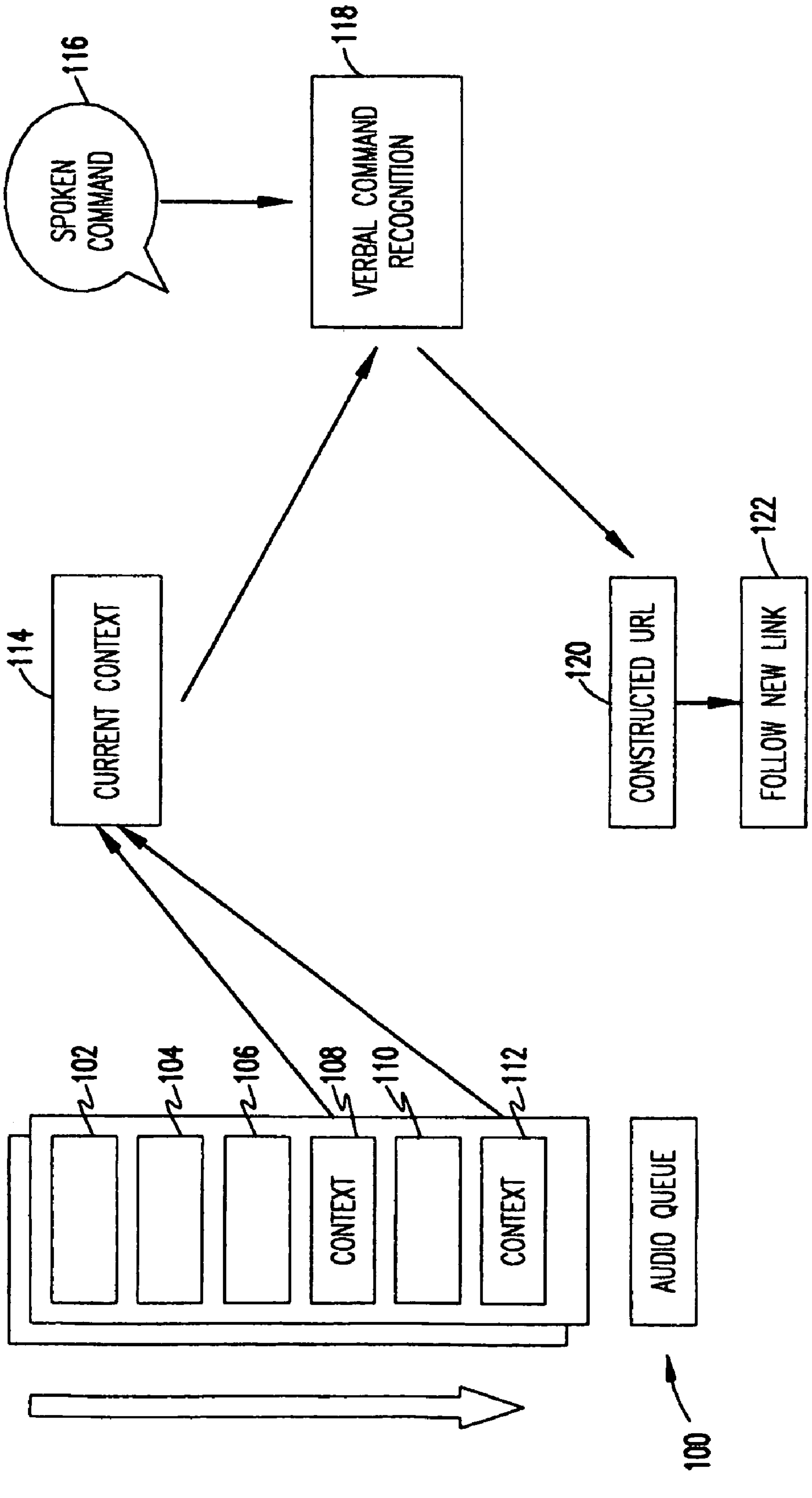
FIG. 1 is a block diagram showing the system of the present invention.

As shown in FIG. 1, the current audio context is tracked by the use of an audio queue 100. The audio queue 100 contains entries for numerous events of interest (102, 104, 106, 108, 110 and 112) to the browser as the audio presentation is being read aloud to the user. The events may include audio context changes, buffers to be spoken, and screen control commands. Other events may also be utilized in a particular application. Of particular interest to the present invention are the audio context changes shown in blocks 108 and 112. As the audio presentation being read aloud by the browser to the user proceeds, the queue 100 is consulted (i.e., the audio queue 100 is being traversed by the program thread responsible for issuing requests to the underlying speech engine for speaking) for additional buffers to speak, context changes to make, and visual adjustments to make, e.g., 102–112. In the case of context changes, 108 and 112, the current context value, 108 or 112, is maintained in a current context register 114 for reference by the verbal command processor 118 should a verbal command 116 be recognized. As the audio presentation proceeds, the context of the event currently being read aloud by the browser is maintained in the current context register 114. If a command spoken by the user 116 is recognized by the speech engine 118, the current context register 114 is consulted to determine and obtain the current context. The current context is then combined with a base URL to form the constructed URL 120 that will be followed. This enables the browser to provide context sensitive behavior that allows a single phrase to act differently, based on when, during the presentation, the command was recognized. The new link is then followed at 122.

The following code provides a working embodiment of the present invention, so that it is necessary to register only a single command that is sensitive to the current phrase, (or phrases) being read. The code obtains a document and renders it both visually and audibly to the user, and reacts to multi-modal input (e.g., input from either the visual component or the aural component). As will be recognized by those skilled in the art, mouse driven input is provided for in lines (11), (19) and (27). The audio context of the list is utilized as it is being read audibly by the speech engine 118. As each buffer is read to the user ("apples", "peaches" and "pumpkin pie" on lines (12), (20) and (28), respectively), the audio context is maintained in a synchronized fashion. Thus, when the speech engine is saying "Apples" (line 12) the context element in effect is "/apples.ebml", and so forth.

EXAMPLE 1

```
<EBML>                                              (1)
<HEAD>                                              (2)
    <META_VERBALCMD NAME="Select"                   (3)
          URL="./calories"                          (4)
          CONTEXT="REQUIRED"/>                      (5)
</HEAD>                                             (6)
<BODY>                                              (7)
  <UL>                                              (8)
    <LI>                                            (9)
      <CONTEXT QDATA= "/apples.ebml">               (10)
        <A HREF="./calories/apples.ebml">           (11)
          Apples                                    (12)
        </A>                                        (13)
        <BREAK MSEC ="3000"/>                       (14)
      </CONTEXT>                                    (15)
    </LI>                                           (16)
    <LI>                                            (17)
      <CONTEXT QDATA="/peaches.ebml">               (18)
        <A HREF="./calories/peaches.ebml">          (19)
          Peaches                                   (20)
        </A>                                        (21)
        <BREAK MSEC ="3000"/>                       (22)
      </CONTEXT>                                    (23)
    </LI>                                           (24)
    <LI>                                            (25)
      <CONTEXT QDATA="/pumpkin-pie.ebml">           (26)
        <A HREF="./calories/pumpkin-pie.ebml">      (27)
          Pumpkin Pie                               (28)
        </A>                                        (29)
        <BREAK MSEC ="3000"/>                       (30)
      </CONTEXT>                                    (31)
    </LI>                                           (32)
  </UL>                                             (33)
</BODY>                                             (34)
</EBML>                                             (35)
```

The <BREAK> tag provides a short pause that allows a user more time to issue a verbal command within the current audio context. Without this delay, the audio context moves too quickly.

As shown in code line (3), a single verbal command (i.e., "Select") is registered by the <META_VERBALCMD> tag. As shown in code lines (10), (18) and (26), each link is enclosed in a <CONTEXT> block. The keyword META_VERBALCMD lists the recognized and registered speech commands and what each one will do. In this case, the word "Select" is registered by the speech engine, as shown in code line (3). The CONTEXT attribute, shown in code line (5), has several settings that affect the way the current audio context is processed should this verbal command be recognized. In the current case, the REQUIRED setting is used, which means that recognized "Select" commands are ignored unless an audio context has been established. If a context has been established, the URL is followed after appending the current context. For example, if the user said "Select" while the current context is that defined by the <CONTEXT>block on code lines (10) through (15), the "/apples.ebml" in code line (10) would be appended to the base URL "./calories" shown in code line (4) to form a URL of "./calories/apples.ebml", which would take the user to the apples page.

When the OPTIONAL setting is used, a URL is always driven. If a context is established, it is appended before driving the URL. If no context has been established, the URL is driven without appending anything. For example, as will be appreciated by those skilled in the art, page-scope commands do not have a sense of audio context. The context of a page changes as the audio presentation of the page progresses. Thus, if an application provides a verbal command called "repeat" whose intent is to re-read a segment of the current page, the CONTEXT=attribute on the <META_VERBALCOMMAND> tag can be used to refine its behavior. By using the CONTEXT="OPTIONAL" attribute, the "repeat" command will always be driven when recognized by the speech engine even if no context has been established. However, if a context is supplied, it will be exploited. An example use of this is to provide the behavior where the recognition of a "repeat" command will re-read a page from the top unless a local context has been established. Should a local context be established, the "repeat" command will re-read based on the local context.

Consider the following document:

EXAMPLE 2

```
<EBML>                                          (1)
  <HEAD>                                        (2)
    <META_VERBALCMD                             (3)
      NAME="repeat"                             (4)
      URL="#top"                                (5)
      CONTEXT="OPTIONAL"/>                      (6)
  </HEAD>                                       (7)
  <BODY>                                        (8)
      <A NAME="top"/>                           (9)
      General content here                      (10)
      <CONTEXT QDATA="plus1paragraph">          (11)
        <A NAME="topplus1paragraph"/>           (12)
        Paragraph 1 content here                (13)
      </CONTEXT>                                (14)
      <CONTEXT RESET="YES"/>                    (15)
      General content here                      (16)
      <CONTEXT QDATA="plus2paragraph">          (17)
        <A NAME="topplus2paragraph"/>           (18)
        Paragraph 2 content here                (19)
      </CONTEXT>                                (20)
      <CONTEXT RESET="YES"/>                    (21)
      General content here                      (22)
      <CONTEXT QDATA="plus3paragraph">          (23)
        <A NAME="topplus3paragraph"/>           (24)
        Paragraph 3 content here                (25)
      </CONTEXT>                                (26)
      <CONTEXT RESET="YES"/>                    (27)
      General content here                      (28)
  </BODY>                                       (29)
</EBML>                                         (30)
```

Lines (3), (4), (5), (6) of the document define a command ("repeat") to the speech engine that when recognized optionally appends any local context structures to the URL attribute defined on line (5). This URL is actually a local reference, that is, a reference to another location on the same page. Lines (9), (12), (18) and (24) define local references that can be used as "targets" of such URLs. Should the "repeat" command be issued while the "General content here" is being read (lines (10), (16), (22) and (28)), the resultant URL would consist of only "#top", because no local context has been established. Note that lines (15), (21) and (27) explicitly reset the local context to "undefined"; thus, no appending of any local context takes place. Should the "repeat" command be issued while a specific paragraph is being read (lines (13), (19) or (25)), the resultant URL would consist of the base URL ("#top" in this case) with the specific context appended to it. For example, should the "repeat" command be issued while line (19) is being read, the resultant URL would be "#topplus2paragraph".

When the IGNORE setting is used, the URL is always driven. Context is never appended even if it is defined. For example, assuming in the above code that CONTEXT="OPTIONAL" is changed to CONTEXT="IGNORE", the issuance of the "repeat" command would always result in a URL of "#top" being built since any local context is "ignored" when that command is recognized.

When the INVALID setting is used, the URL is driven only if a context is not defined. Again, in reference to the above code, changing the CONTEXT="OPTIONAL" to CONTEXT="INVALID" would result in a behavioral change. If the "repeat" command were issued while a local context was defined, the "repeat" command would be ignored and no URL would be driven. So, if the "repeat" command were issued during the reading of lines (13), (19) or (25), the command would be ignored. If, however, the command were issued during the reading of lines (10), (16), (22) or (28) (when local context is not defined) the command would be honored and the resultant URL would always be "#top".

As the audible presentation from the browser continues, the audio context is continually monitored. Should the "Select" command be recognized by speech engine 118 shown in FIG. 1, the URL to be followed consists of the base URL (defined in the <META_VERBALCMD> tag) augmented with the contents of the QDATA attribute in the appropriate <CONTEXT> block, as shown in lines (10), (18) and (26) of the code in Example 1. The contents of the QDATA attribute need not consist of only traditional query data, but can be used to build the entire URL as simple concatenation is performed to build the resultant URL. Thus, if the current audio presentation had just finished saying "Peaches" in reference to the code in Example 1, and the "Select" verbal command was recognized, the resultant URL to be followed would be ./calories/peaches.ebml, as shown in code line (18).

As voice commands are needed by an application, they must be registered/enabled to the speech engine 118 in FIG. 1. In order to accomplish this, the present invention provides a system of encoding this information within the markup being displayed. As discussed, the keyword META_VERBALCMD lists the recognized and registered speech commands and what each one will do. This applies to EBML page-scope commands, like HELP or REFRESH, that affect a whole page in scope. Page commands (e.g., the HELP and REFRESH commands available on standard browsers) affect the entire page, and work the same and issue the same URL command to the application regardless of the audio context. In fact, the application could have such buttons on the screen that allow the user to interact with the application verbally, visually, or both in one session.

To continue with the sample code in Example 1, if the current audio presentation had just finished saying "Peaches" and the "Select" verbal command was recognized, the resultant URL to be followed would be:

./calories/peaches.ebml

Figure 2:
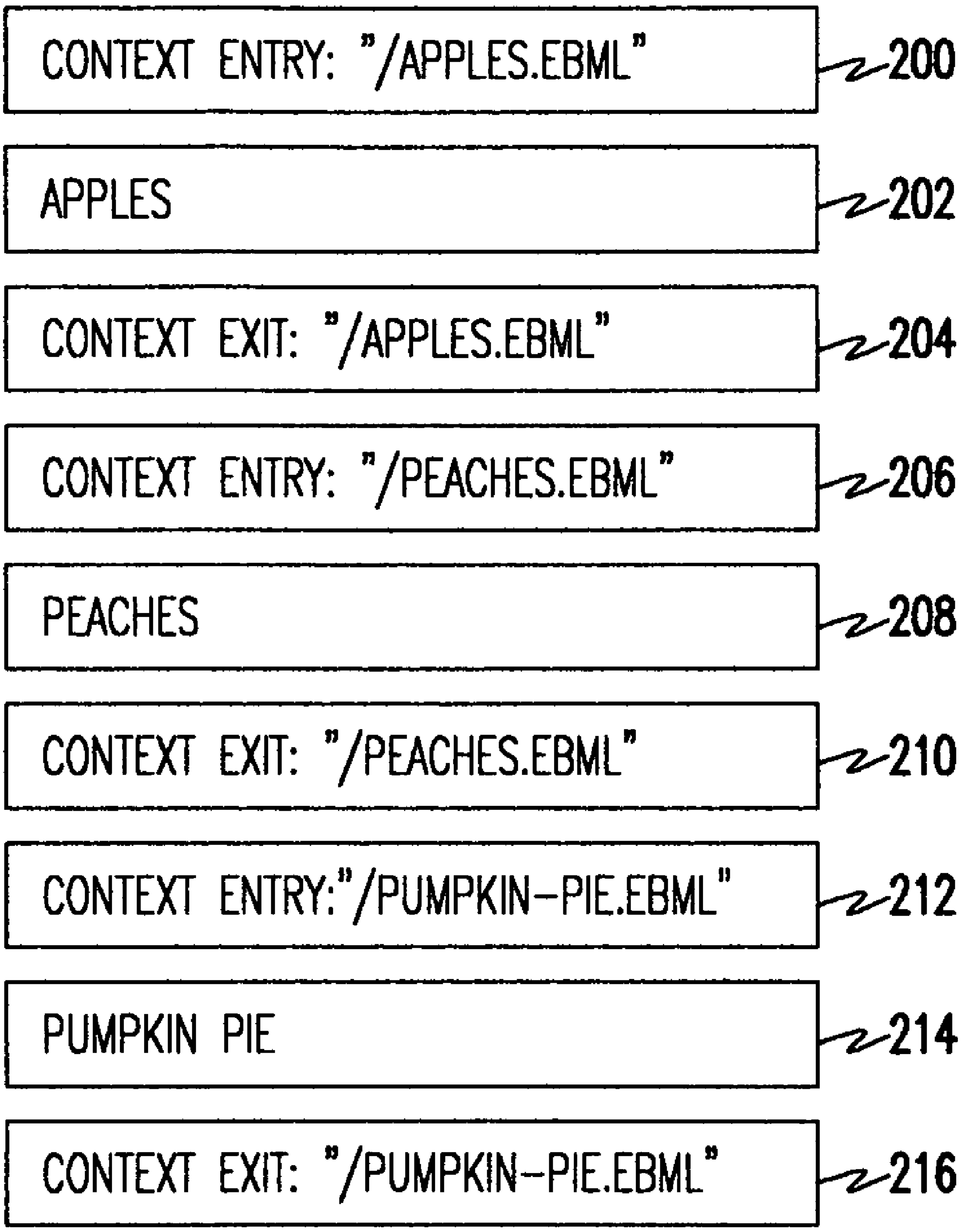
FIG. 2 is a diagram that shows an audio queue.

FIG. 2 shows how the audio queue 100 looks after lines (1)–(29) of the sample code are processed. During the parsing and processing of the document (e.g., the above code lines (1)–(30) of code), the various views (including the audio queue 100 in FIG. 1) are built. This action takes place before the document is rendered (either aurally or visually). As the document is parsed, appropriate elements are constructed and placed on the audio queue 100. The types and ordering of buffers is determined by the specific document being parsed.

FIG. 2 is a partial representation of the audio queue 100 after code lines (1)–(30) of code have been parsed. There are other elements that may be present on the audio queue 100 that have been ignored for clarity. These "missing" audio elements are primarily used for visual synchronization and have no effect on the concepts being addressed by this disclosure.

The elements in FIG. 2 indicated by 200, 204, 206, 210, 212 and 216 directly result from the <CONTEXT QDATA="ddddd"> from lines of code (1)–(30). The "ddddd" from the QDATA=attribute is contained within the audio queue element which resides on the audio queue 100. These elements are placed on the queue 100 in pairs. One element is placed on the audio queue 100 when the context block is entered, another element is placed on the audio queue 100 when the context block is exited.

The actual speakable buffers (202, 208 and 214) contained on the audio queue 100 are also obtained directly from the document as it is parsed. These buffers are to be spoken by the speech engine in turn as the audio progression proceeds.

The key concept in this area is that as the buffers are presented to the speech engine for speaking, the context elements are also being processed, non-audibly. It is this mechanism that allows the context to remain synchronized with the audible presentation as it moves forward.

In summary, the invention provides a generic way of encoding information needed by an application to register voice commands and enable the speech engine. This is done by introducing new HTML statements with the keyword META_VERBALCMD which list the recognized/registered speech commands and what each one will do. This applies to commands that effect a whole PAGE in scope, line the "help" or "refresh" command. No matter where a user is on the page or what the user is doing, these commands work the same and issue the same URL command to the application just as if the user physically clicked on the HELP or REFRESH buttons on the screen.

The invention further provides a sense of audio context. The context of a page changes as the audio presentation of the page progresses. The invention adds the ability to alter the action based on the current audio context by adding the CONTEXT option to the META_VERBALCMD statements. In one possible example, the application is a trip planner installed in an automobile and includes code to read directions to the driver while displaying a map. The verbal command "repeat" would cause the application to read the whole page of directions from the top line; however, if CONTEXT=OPTIONAL is specified, the browser would tell the application the context so that the application could tailor it's response. If the user was listening to a direction when he or she said "repeat", the application could repeat that particular direction, but if the user was not listening to anything at the time he or she said "repeat" (i.e., there is no current CONTEXT), the command "repeat" would mean to read the page starting from the top.

In the following example, some verbal commands like "open" have CONTEXT="REQUIRED". In this example where the person is working on their e-mail verbally while driving, this command allows the user to say "open" while the application is reading the sender/topic to have the application open the e-mail message it was just reading. Obviously, saying "open" when nothing is being read does not make sense because it is unclear what should be opened. In this case, specifying CONTEXT="REQUIRED" says that the browser should only recognize the spoken word "open" as a command when there is some context associated with the application at the time and ignore it otherwise. For example, when the user arrives at a rest stop, the user could say "stop reading" to stop reading the e-mail even though the mail is still on the screen and could tell young passengers, "You can open the door now and get out", without having the application interpreting the word "open" as a command because there is no CONTEXT.

While the invention has been described in terms of a single preferred embodiment, those skilled in the art will recognize that the invention can be practiced with modification within the spirit and scope of the appended claims.

Having thus described our invention, what we claim new and desire to secure by Letters Patent is as follows:

1. A system for providing context based verbal commands to a multi-modal browser, comprising:

a context-based audio queue ordered based on contents of a page being audibly read by the multi-modal browser to a user;

a store for storing a current context of the audio queue; and a speech recognition engine for recognizing and registering voice commands, wherein said speech recognition engine compares a current audio context with the context associated with a voice command and causes the browser to perform an action based on the comparison, wherein when a first tag is used to designate the audio context, recognized voice commands associated with the audio context are ignored unless an audio context has been established, and wherein if a context has been established, a Uniform Resource Locator (URL) is followed after appending the current context.

2. The system as recited in claim 1, wherein the browser action comprises accessing a different Uniform Resource Locator (URL) and rendering a page specified by the URL.

3. The system as recited in claim 1, wherein said first tag is designated a REQUIRED tag.

4. The system as recited in claim 1, wherein when a second tag is used to designate the audio context, if a context is established, it is appended before driving the URL, and wherein if no context is established, the URL is followed without appending anything.

5. The system as recited in claim 4, wherein the second tag is designated an OPTIONAL tag.

6. The system as recited in claim 4, wherein when a third tag is used to designate the audio context, the context is not appended even if it is defined.

7. The system as recited in claim 6, wherein the third tag is designated an IGNORE tag.

8. The system as recited in claim 6, wherein when a fourth tag is used to designate the audio context, the command is driven only if a context is not defined.

9. The system as recited in claim 8, wherein the fourth tag is designated an INVALID tag.

10. The system as recited in claim 1, wherein the page being audibly read is a markup language page.

11. A computer implemented method for providing context based verbal commands to a multi-modal browser, comprising the steps of:

building a context based audio queue based on the contents of markup language page being audibly read by the multi-modal browser to a user;

storing a current context of the audio queue; and recognizing and registering voice commands, wherein the current audio context is compared with a voice command, thereby causing the multi-modal browser to perform an action based on the comparison, wherein when a first tag is used to designate the audio context, recognized voice commands associated with the audio context are ignored unless an audio context has been established, and wherein if a context has been established, a Uniform Resource Locator (URL) is followed after appending the current context.

12. The computer implemented method for providing context based verbal commands to a multi-modal browser as recited in claim 11, wherein said first tag is designated a REQUIRED tag.

13. The computer implemented method for providing context based verbal commands to a multi-modal browser as recited in claim 11, wherein the browser action comprises accessing a different Uniform Resource Locator (URL) and displaying the contents of the URL.

14. The computer implemented method for providing context based verbal commands to a multi-modal browser as recited in claim 13, wherein when a second tag is used to designate the audio context, if a context is established, it is appended before following the URL, and wherein if no context is established, the URL is driven without appending anything.

15. The computer implemented method for providing context based verbal commands to a multi-modal browser as recited in claim 14, wherein the second tag is designated an OPTIONAL tag.

16. The computer implemented method for providing context based verbal commands to a multi-modal browser as recited in claim 14, wherein when a third tag is used to designate the audio context, the context is not appended even if it is defined.

17. The computer implemented method for providing context based verbal commands to a multi-modal browser as recited in claim 16, wherein the third tag is designated an IGNORE tag.

18. The computer implemented method for providing context based verbal commands to a multi-modal browser as recited in claim 16, wherein when a fourth tag is used to designate the audio context, the command is driven only if a context is not defined.

19. The computer implemented method for providing context based verbal commands to a multi-modal browser as recited in claim 18, wherein the fourth tag is designated an INVALID tag.

* * * * *